UNITED STATES PATENT OFFICE.

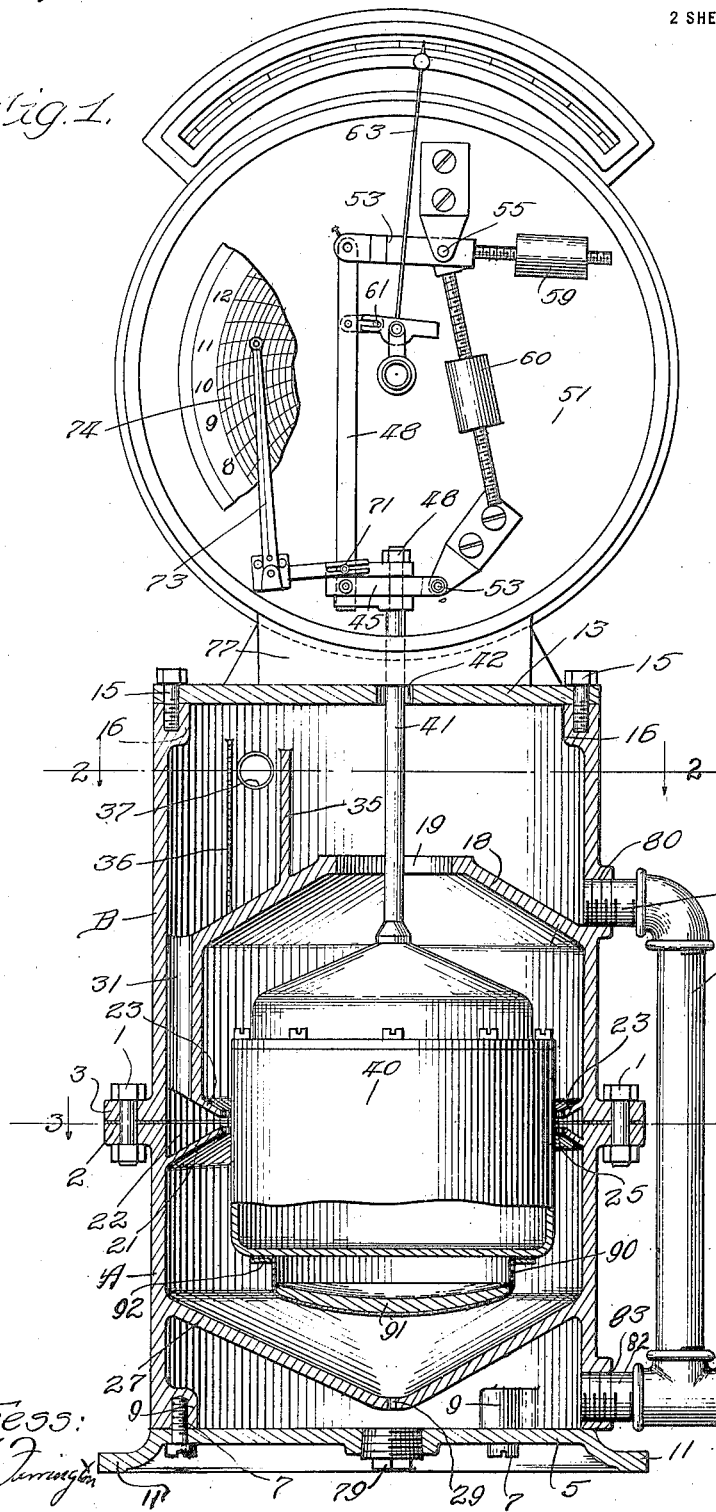

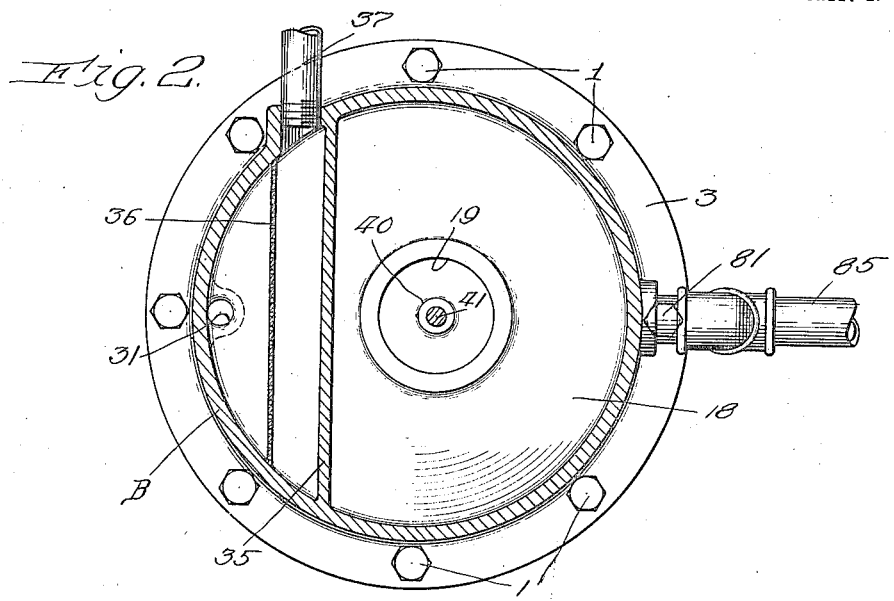
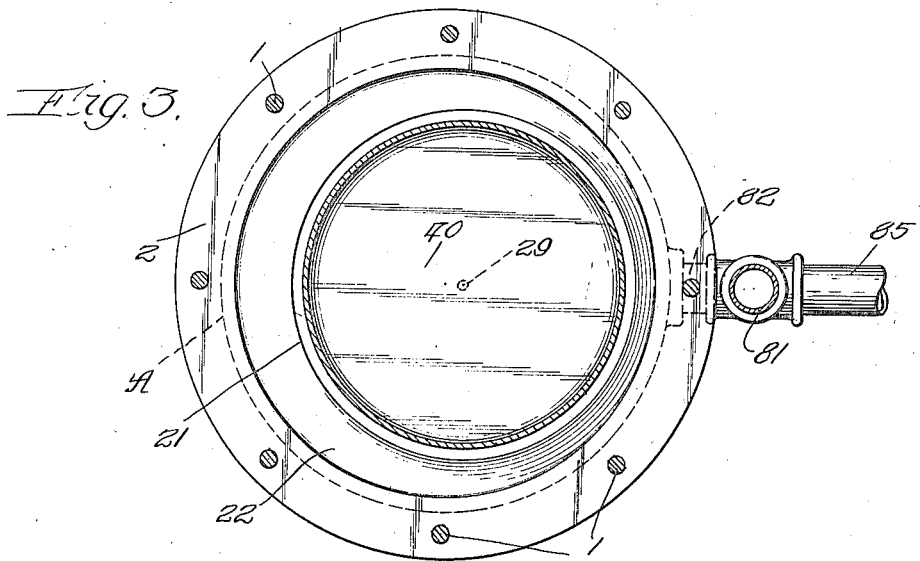

RICHARD G. BRINDLE, OF CHICAGO, ILLINOIS, ASSIGNOR OF ONE-HALF TO WADE W. REECE, OF CHICAGO, ILLINOIS.

TESTING DEVICE.

1,384,886.             Specification of Letters Patent.     Patented July 19, 1921.

Application filed October 27, 1919. Serial No. 333,597.

*To all whom it may concern:*

Be it known that I, RICHARD G. BRINDLE, a citizen of the United States, residing in the city of Chicago, in the county of Cook and State of Illinois, have invented new and useful Improvements in Testing Devices, of which the following is a specification.

This invention relates to measuring or testing devices for determining the specific gravity or density of liquids and more especially to a device for continuously measuring, indicating, and recording the specific gravity of a liquid which is flowing through the device, in order to determine the specific gravity of such liquid at all times although its density may be changing either continuously or periodically. The device may be used with a liquid flowing through a pipe for indicating changes in its specific gravity. When so used, a portion of the liquid is diverted through the measuring device and tested to show the variations of the specific gravity of the liquid from which the portion is diverted, or the sample taken.

It is obvious that any scale may be used on the device by making proper adjustments, since the principal purposes of this device, like other devices of its kind, is to show the relation between the specific gravity of the liquid tested and the specific gravity of any other liquid adopted as a standard; and to show the changes from time to time in the specific gravity of the liquid being tested.

In that form of device embodying the features of my invention, shown in the accompanying drawings, Figure 1 is a vertical sectional view, Fig. 2 is a view taken as indicated by the line 2 of Fig. 1, and Fig. 3 is a view taken as indicated by the line 3 of Fig. 1.

The device comprises, in general, a cast iron cylindrical shell composed of the lower part A and the upper part B. The part A has an upwardly turned flange 2 at its upper edge and the part B a similar flange 3 at its lower edge. The two parts A and B are joined together by the bolts 1, 1 extending through holes provided in the flanges 2 and 3. The bottom of the part A is covered by the circular bottom plate 5, which is fastened to the part A by the cap screws 7, 7 extending into the bosses 9, 9 at the bottom edge of the part A. The bottom plate 5 is also provided with a downwardly and outwardly extending flange 11 in order to furnish a standard for the device. The upper end of the part B is covered by the circular cover plate 13 which is attached by the cap screws 15, 15 extending into the bosses 16, 16 at the upper edge of the part B.

The upper part B is provided with a diaphragm 18 at about its center part, said diaphragm being attached to the wall of the part B, upwardly inclined toward its center, and provided with a large opening 19 in its center.

The part A is provided, near its upper edge, with an inwardly extending and upwardly inclined flange 21. This flange 21 is not of a uniform width but tapers at each side from its widest point to its narrowest point which is diametrically opposite. The flange 21, it will be noted, forms a trough 22 around the interior surface of the upper edge of the part A. The flange 21 and trough 22 are clearly shown in Fig. 3. The part B is similarly provided, near its lower edge with an inwardly extending and downwardly inclined flange 23, over-hanging the trough 22. This flange 23 is not of a uniform width but tapers at each side from its widest part which is directly above the widest part of the trough 22 to its narrowest part which is diametrically opposite. The inner edge of the flange 23 lies directly above the inner edge of the flange 21 throughout its entire length. The inclinations and widths of the flanges 21 and 23 are not sufficient for their inner edges to meet, accordingly there is left between such edges, the circular crack or slot 25.

The part A is provided near its bottom end with a diaphragm 27 which is attached to the wall of the part A and inclined downwardly toward its center and provided with a small hole 29 at its center point.

At the side of the part B where the flange 23 has its greatest width, leading from the diaphragm 18 to such flange 23, is the circular port 31 which opens through the diaphragm 18 at its upper end and through the flange 23 at its lower end.

Above the diaphragm 18, extending across the part B to one side of the center, is the dam 35 with its bottom edge fastened on the diaphragm 18, its upper edge a short distance below the cover plate 13 and its ends meeting the walls of the part B at points approximately 120 degrees apart.

Parallel to the dam 30 and arranged in the same manner but slightly higher and somewhat shorter is the screen 36. Both the dam 35 and the screen 36 are placed to the side of the diaphragm 18 nearest the opening of the port 31 and the screen 36 lies between the dam and the opening to such port. Opening into the part B, above the diaphragm 18, between the dam 35 and the screen 36, at a point slightly lower than the upper edge of the dam 35, is the inlet hole 37.

Within the device, between the diaphragms 18 and 27, is a hollow displacing body 40 formed of sheet metal or any suitable material suspended by the stem 41 which extends upwardly through the hole 19 in the diaphragm 18 and through the hole 42 which is near the center of the cover plate 13. The upper end of the stem 41 is attached to and suspended from the indicating and recording mechanism which forms no part of the present invention. I have here shown such indicating and recording mechanism to consist of the short bifurcated lever 45 on the upper edges of which the end of the stem 41 is supported by the nut 48. One end of the lever 45 is pivoted to the dial 51 by means of the pivot 53. The other end of the lever 45 is attached by means of the vertical link 48 to one end of the lever 53 which is pivoted at 55 to the dial 51. The other end of the lever 53 is provided with the adjustable counter-weight 59. The counterweight 60 is provided on a branch extending from the pivot point of the lever 53 for the purpose of giving additional and finer adjustment. Mounted near the upper end of the link 48 is a small pin 61 engaging with a slot in an extending branch attached to the indicating pointer 63, the end of which is adapted to move across an arc shaped scale mounted on the top of the dial 51 with suitable gradations. Near the lower end of the link 48 there is an additional pin 71 engaging with a slot in a branch leading from the recording pointer 73, the end of which is, by means of a pencil point or ink, adapted to make a permanent record on a card 74 rotated by clock work or any other suitable means. The dial 51 is supported by means of the upright member 77 mounted on the top of the cover plate 13. The indicating and recording mechanism is so arranged and adjusted that the upward and downward movement of the body 40 will be indicated by the pointer 63 on the scale and recorded by the pointer 73 on the rotating disk 74.

The bottom plate 5 is provided with a plug 79 threaded into a hole near its center, adapted to be removed for cleaning purposes.

Opening into the part B just above the diaphragm 18 at a point diametrically opposite the opening of the port 31 is provided a threaded opening 80 in which is screwed the pipe 81 leading outwardly and then downwardly and joining by means of a T a short pipe 82 which is threaded into an opening 83 directly below the opening 80 entering the part A below the diaphragm 27. The other branch of the T leads to the drain pipe 85.

There is attached to the bottom flattened surface of the displacing body 40 an extension 90 composed of sheet rubber or other suitable material in which is suspended the wooden disk 91. The sheet rubber 90 is cylindrical in shape of smaller diameter than the displacing body 40 with an upwardly turned flange 92 at its upper edge which is glued or otherwise suitably attached to the bottom surface of the displacing body 40. The wooden disk 91 is of sufficient diameter to fill the sheet rubber cylinder 90 and of a thickness substantially less than the height of such cylinder so that there is provided above such disk 91, within the sheet rubber cylinder, a substantial volume of air.

The displacing body 40 is of such a size and so suspended that its up and down movement is permitted between the diaphragm 18 and the diaphragm 27; and it is of such a diameter that it will lie within the inside edges of the flanges 21 and 23 at an equal distance from such flanges at all points. It is also so suspended that the slot 25 will lie in a plane passing through substantially its center point.

In the operation of my improved device the liquid to be tested is admitted to the inlet opening 37 whence it falls between the dam 35 and the screen 36. It then passes through the screen 36 downwardly through the port 31 and fills the trough 22 issuing from such trough through the slot 25 into the chamber occupied by the displacing body 40. The flange 23 prevents the liquid from flowing out of the trough at substantially one place and causes the liquid to flow around the entire trough so that it will issue from the slot 25 at practically equal rates at all points. The hole 29 in the diaphragm 27 is not of sufficient size to allow the liquid to escape at the same rate as it enters. As a result the receptacle between the diaphragm 18 and the diaphragm 27 is completely filled so that the liquid overflows through the hole 19 around the stem 41 in the diaphragm 18, whence it issues through the pipe 81 into the drain pipe 85. Any liquid which flows through the hole 29 flows out through the pipe 82 and into the drain pipe 85.

The suspension of the displacing body 40 is so adjusted that the pointers 63 and 73 will stand at any desired points when the receptacle is filled with a liquid of known quantity. When such receptacle is filled with a liquid of a greater density the body 40 will tend to rise with a consequent indication by the pointers 63 and 73 and vice versa when the density in the receptacle becomes less. It is obvious also that the extent of deflection of the pointers 63 and 73 will indicate the degree of change in the density of the liquid in the receptacle.

By the foregoing it has been shown how the density or specific gravity of the liquid within the receptacle between the diaphragms 18 and 27 may be tested, but since the specific gravity of liquid varies with changes in its temperature it is necessary to provide temperature compensating means, if it is desired to determine from a reading of the indicating device what would be the specific gravity at a different temperature from its actual temperature. As for example, where the liquids flowing through the apparatus vary in temperature and it is desired in all cases to determine what their densities would be at a given temperature. For this purpose there is provided at the bottom of the displacing body 40 the sheet rubber cylinder or extension 90 above described. By experimental means the size and elasticity of this rubber is so adjusted that an increase in temperature of the liquid being tested will cause a consequent expansion of air within such rubber cylinder and consequent extension or inflation or stretching of such rubber with the result that the volume of such rubber extension 90 is increased to such an extent as to render the body 40 sufficiently more buoyant to counteract the diminished specific gravity of the liquid due to such temperature increase. It is obvious that decreases in temperature in the liquid being tested will likewise be compensated for in a similar manner.

It is obvious that the displacing body 40 may be so constructed and be of such weight, that it will tend to either float or sink in water or in any other fluid being tested by the device, since all that is necessary to indicate changes in the specific gravity is an indication of the variations in either the upward or downward pressure of such body. Such displacing body therefore, is so counter balanced by the indicating mechanism on the dial, and by the counter weights 59 and 60, so that when the receptacle between the diaphragms 18 and 27 is filled with a liquid of known specific gravity adopted as a standard, such body 40 will be suspended substantially midway between the two diaphragms 18 and 27 and the indicators 63 and 73 will each be at a point approximately in the center of their swing adopted as a base point from which it is desired to indicate variations to either side.

As described above a plane lying in the slot 25 will pass through a point substantially in the center of the body 40. It will be noted that with this construction the fluid issuing from such slot will impinge against the outer surface of the body 40 on a circle lying in a plane passing through a point substantially at its center. It is obvious, therefore, that inflowing liquid so striking the body will be diverted partially upward and partially downward, since there is a discharge opening 29 at the bottom of the receptacle between the diaphragms 18 and 27 and also one, 19, at the top, in the diaphragm 18. As a result of this construction the impingement against the body 40 of the inflowing liquid and the currents of such liquid inside the receptacle will have no, or practically no tendency to move the body 40 upward or downward and, therefore, will not substantially disturb the position of the indicators 63 and 73 which show the specific gravity of the liquid being tested.

The hole 19 in the diaphragm 18 at the top of the float receptacle is of a large size as shown, in order to permit a free and easy overflow from the receptacle occupied by the displacing body so that the liquid in such receptacle will never stand any higher than the level of such hole.

I claim:

1. In a testing device, a liquid containing receptacle, a displacing body suspended in such receptacle, means for indicating changes in the upward and downward pressure of such displacing body, and means for introducing liquid into the receptacle substantially in a horizontal plane passing through the center of the displacing body.

2. In a testing device, a liquid containing receptacle with liquid therein at a constant height, a displacing body suspended in such receptacle, means for indicating the changes in the upward and downward pressure of such displacing body, and means for introducing liquid into the receptacle substantially in a horizontal plane passing through the center of the displacing body.

3. In a testing device, a liquid containing receptacle with liquid therein at a constant height, means for changing the liquid in such receptacle comprising means for introducing the liquid substantially in a horizontal plane passing through the center of the displacing body and means for permitting the liquid to flow from such receptacle, a displacing body suspended in such receptacle, and means for indicating the changes in the upward and downward pressure of such displacing body.

4. In a testing device, a liquid containing receptacle with liquid therein at a constant height, means for continuously changing the liquid in such receptacle comprising means for introducing the liquid substantially in a horizontal plane passing through the center of the displacing body and means for permitting the liquid to flow from such receptacle, a displacing body suspended in such receptacle, and means for indicating the changes in the upward and downward pressure of such displacing body.

5. In a testing device, a liquid containing receptacle, a displacing body suspended in such receptacle, such displacing body having an extension attached thereto, such extension adapted to be increased in volume by an increase in temperature to a greater extent than the displacing body itself, and means for indicating the changes in the upward and downward pressure of such displacing body.

6. In a testing device, a liquid containing receptacle with liquid therein at a constant height, a displacing body suspended in such receptacle, such displacing body having an extension attached thereto, such extension adapted to be increased in volume by an increase in temperature to a greater extent than the displacing body itself, and means for indicating the changes in the upward and downward pressure of such displacing body.

7. In a testing device, a liquid containing receptacle with liquid therein at a constant height, means for changing the liquid in such receptacle, a displacing body suspended in such receptacle, such displacing body having an extension attached thereto, such extension adapted to be increased in volume by an increase in temperature to a greater extent than the displacing body itself, and means for indicating the changes in the upward and downward pressure of such displacing body.

8. In a testing device, a liquid containing receptacle with liquid therein at a constant height, means for continuously changing the liquid therein, a displacing body suspended in such receptacle, such displacing body having an extension attached thereto, such extension adapted to be increased in volume by an increase in temperature to a greater extent than the displacing body itself, and means for indicating the variations in the upward and downward pressure of such displacing body.

9. In a testing device, a liquid containing receptacle, a displacing body suspended in such receptacle, means for introducing liquid into such receptacle substantially in a plane passing through the center of the displacing body, means for indicating the changes in the upward and downward pressure of such displacing body, and means operated by changes in temperature of the liquid for changing the volume of the displacing body.

10. In a testing device, a liquid containing receptacle with liquid therein at a constant height, a displacing body suspended in such receptacle, means for introducing liquid into the receptacle substantially in a horizontal plane passing through the center of the displacing body, means for indicating the changes in the upward and downward pressure of such displacing body, and means operated by changes in temperature of the liquid for changing the volume of the displacing body.

11. In a testing device, a liquid containing receptacle with liquid therein at a constant height, means for changing the liquid in such receptacle comprising means for introducing liquid substantially in a horizontal plane passing through the center of the displacing body and means for permitting escape of liquid from the receptacle, a displacing body suspended in such receptacle, means for indicating the changes in the upward and downward pressure of such displacing body, and means operated by changes in temperature of the liquid for changing the volume of the displacing body.

12. In a testing device, a liquid containing receptacle with liquid therein at a constant height, means for continuously changing the liquid in such receptacle comprising means for introducing liquid substantially in a horizontal plane passing through the center of the displacing body and means for permitting escape of liquid from the receptacle, a displacing body suspended in such receptacle, means for indicating the changes in the upward and downward pressure of such displacing body, and means operated by changes in temperature of the liquid for changing the volume of the displacing body.

13. In a testing device, a liquid containing receptacle, means for continuously changing the liquid in such receptacle while maintaining the same at a constant height, said means comprising an admission port substantially in a horizontal plane passing through the center of the displacing body and an outlet port, and a displacing body suspended in such receptacle.

In witness whereof, I have hereunto subscribed my name this 2nd day of Sept., 1919.

RICHARD G. BRINDLE.